April 5, 1927. 1,623,342
J. H. HARRINGTON
TREATMENT OF WATER
Filed Feb. 2, 1924 3 Sheets-Sheet 1
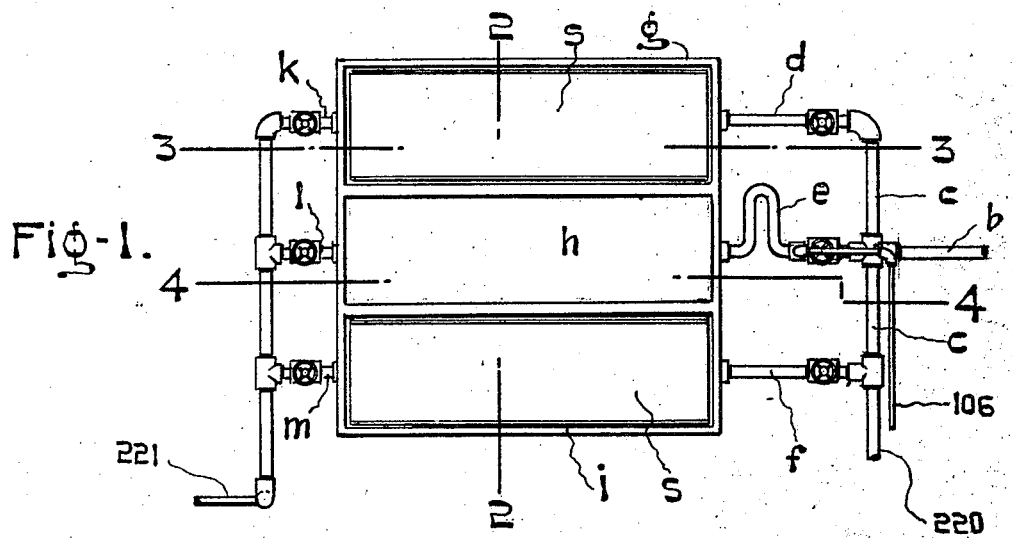
Fig-1.
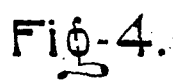
Fig-4.
Fig-5.
Fig-2.
Fig-3.
John H. Harrington, Inventor,
Attorney.
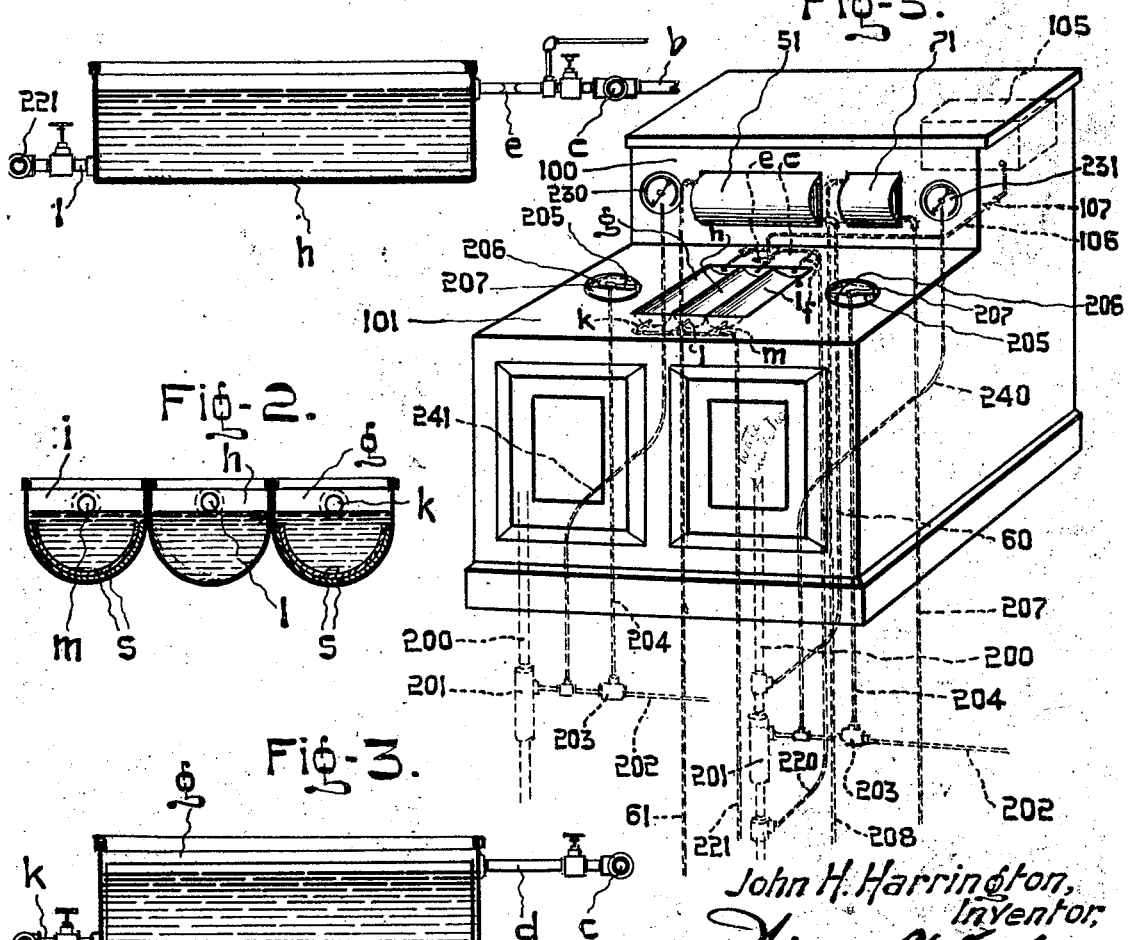

April 5, 1927. 1,623,342
J. H. HARRINGTON
TREATMENT OF WATER
Filed Feb. 2, 1924  3 Sheets-Sheet 2
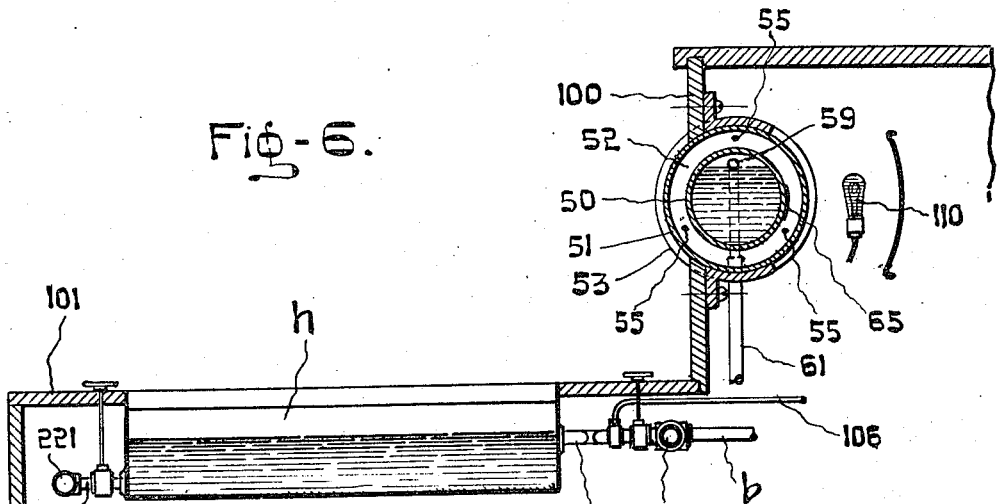
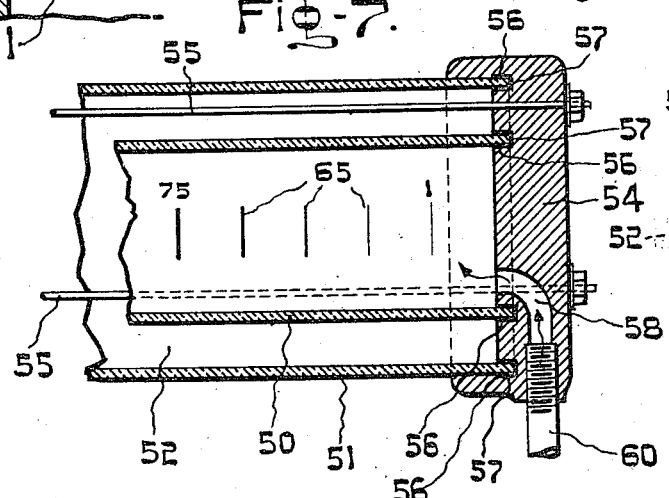
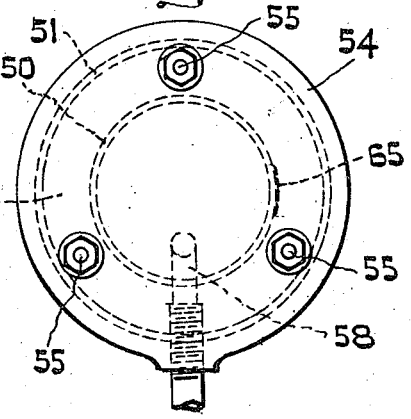
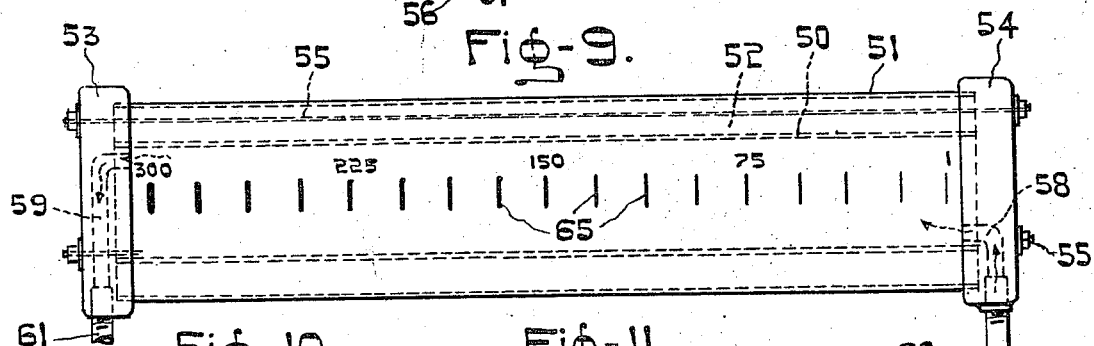
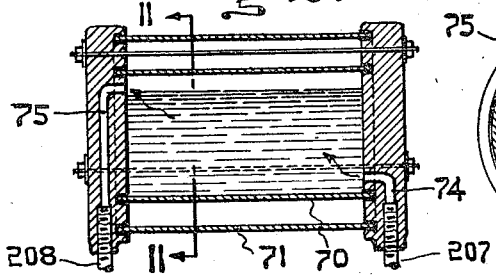
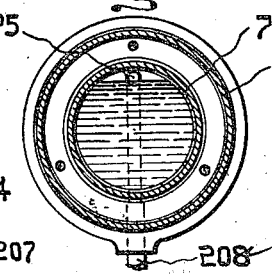
John H. Harrington,
Inventor,
Attorney.

April 5, 1927.
J. H. HARRINGTON
TREATMENT OF WATER
Filed Feb. 2, 1924
1,623,342
3 Sheets-Sheet 3
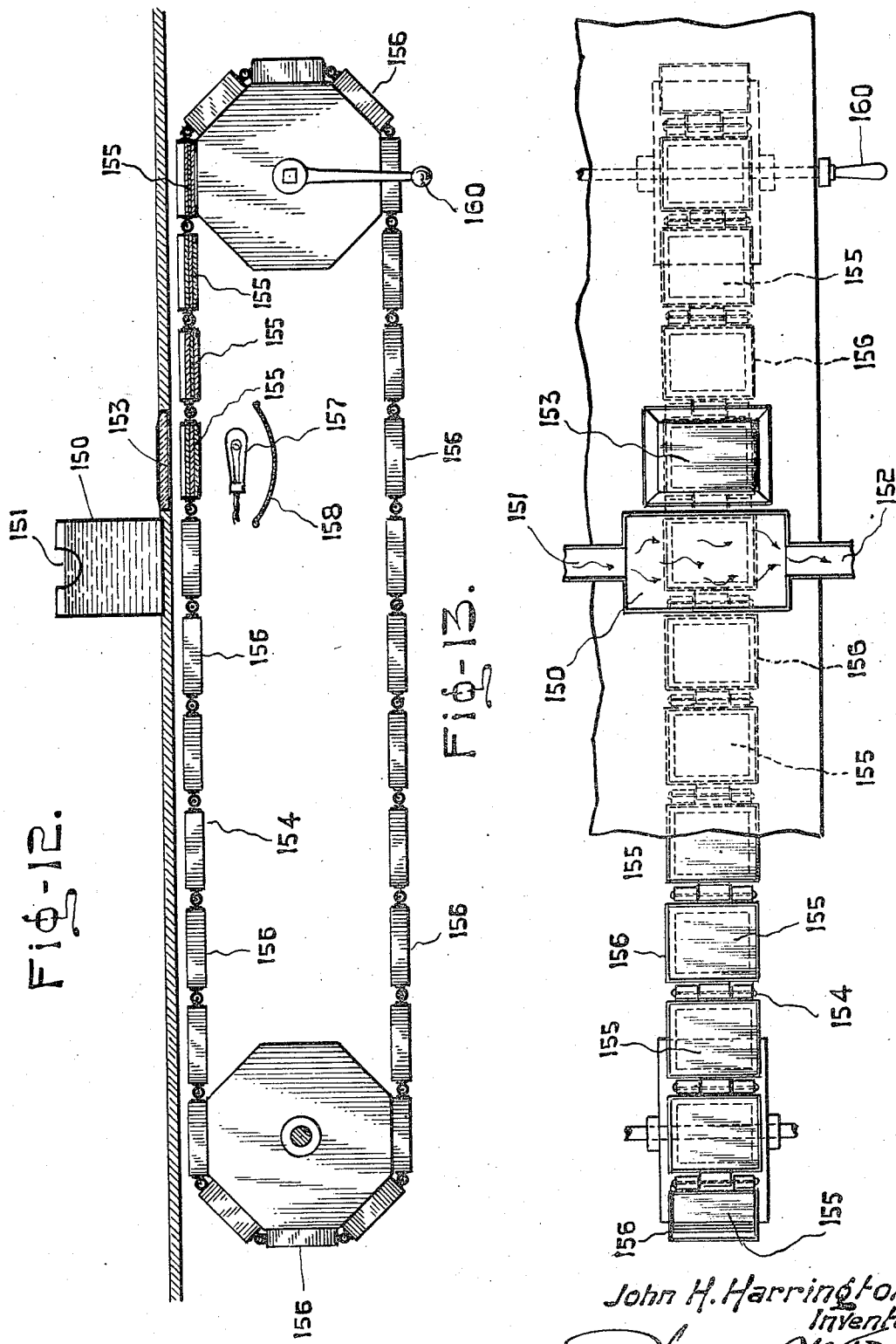

Patented Apr. 5, 1927.

1,623,342

UNITED STATES PATENT OFFICE.

JOHN HENRY HARRINGTON, OF BAIE D'URFE, QUEBEC, CANADA, ASSIGNOR OF ONE-THIRD TO GEORGE W. ROBB, OF MONTREAL, QUEBEC, CANADA.

TREATMENT OF WATER.

Application filed February 2, 1924. Serial No. 690,109.

My invention relates particularly to the treatment of water for purification and has for its object to provide a permanent indicator of the state of the water after having passed through a purification process.

Heretofore it has been the practice in the purifying of water by chlorination to subject the treated water to test by bacteriological method from time to time or subject it from time to time to a chemical test for residual chlorine. The first mentioned of these tests is relatively slow and the last mentioned is unreliable because it is impossible for the human eye to effect a reliable test of color without some constant standard of color with which it may be compared. My invention provides an apparatus through which the treated water may be caused to flow and which contains a permanent indicator of color value with which the portion of the water being tested for residual chlorine may be compared at a glance.

More specifically stated my invention may be said to consist of an apparatus for indicating at a glance the state of purification of water after having passed through a chlorination process.

For full comprehension, however, of my invention reference must be had to the accompanying drawings in which similar reference characters indicate the same parts and wherein:

Figure 1 is a plan view of an apparatus suitable for use in the treatment of water according to my invention;

Figure 2 is a transverse sectional view taken on line 2—2 Figure 1;

Figure 3 is a longitudinal sectional view taken on line 3—3 Figure 1;

Figure 4 is a longitudinal sectional view taken on line 4—4 Figure 1;

Figure 5 is an isometrical view of a cabinet with my improved indicating apparatus set therein;

Figure 6 is a sectional view through the cabinet the section being taken from front to rear;

Figure 7 is a detail longitudinal sectional view of the turbidimeter;

Figure 8 is an end view thereof;

Figure 9 is a detail view of the turbidimeter;

Figure 10 is a detail sectional view of the purified water conductor;

Figure 11 is a transverse sectional view thereof taken on line 11—11 Figure 10;

Figure 12 is a side elevation partly in section illustrating a modified apparatus employed for testing by comparison the color of water as it enters the intake and a color producing device of known color value; and Figure 13 is a fragmentary plan view of the modification.

Water to be tested for residual chlorine is conducted by a pipe $b$ to a header $c$ from which branches $d$, $e$ and $f$ lead to a plurality of water conductors $g$, $h$ and $i$ respectively preferably in the form of open top enamel, porcelain or other white troughs from which the water is discharged through $k$, $l$ and $m$. The troughs $g$ and $i$ have blue plates on the bottom, the number of plates being increased or diminished in accordance with the depth of color required, as will be presently described. These plates are indicated at $s$.

The water to be tested is conducted by pipe $b$ and is distributed by the header $c$ and branch pipes $d$, $e$ and $f$ through the troughs.

Bacteriological test is as usual first made and the water is then treated with chlorine for the purpose of destroying the bacteria found to exist in the water. This chlorination is at the usual rate. A sample of the chlorinated water is then tested for residual chlorine by the usual chemical method. A color test is then made with the usual color developing agent; potassium iodide starch solution is commonly used. This color test develops a color value which indicates the amount of chlorine present in the water. The color produced is blue and its value or shade is equivalent to the amount of residual chlorine in the water. Consequently if there is residual chlorine, or in other words, chlorine over and above that known to be sufficient to destroy the bacilli shown by the bacteriological test to be present in the water, the blue color appearing in the water will have depth of shade or color-value in proportion to the amount of residual chlorine present.

According to my invention when this shade of blue is determined it is matched by a blue device, preferably one of the plates $s$, one or a number of which will produce varying shade or color value, and these plates are placed on the bottom of each of the troughs $g$ and $i$. I prefer to use suitable blue glass and in order to obtain different degrees or depths of blue I pile one upon the other, any desired number, until the color developed in the test has been matched. I have found that the particular blue glass employed microscopically when a blue field is desired, is suitable. No plates are placed in the conductor $h$. Water to be matched is caused to flow, as above described, or otherwise, in separate streams through the respective troughs $g$, $h$ and $i$, and if looked at from above the water flowing through the troughs $g$ and $i$ will appear with the color of the plate, while the water flowing through the trough $h$ will be unaffected and have its initial inherent color. I add potassium iodide starch solution to the stream flowing through the trough $h$ and a blue color is immediately developed in that water. In the event of the residual chlorine in the water being excessive a deep blue will appear in trough $h$, possibly of inky blackness, and if there is insufficient residual chlorine little or no color will appear. My idea is to establish a color representative of what has been established as the proper amount of residual chlorine. To facilitate comparison between the flowing water and a standard I provide two limits indicative of the maximum and minimum quantity of residual chlorine allowable as determined by bacteriological and physical tests. For instance the usual tests of a sample of a given water supply may indicate that three tenths of a part of chlorine per million parts of water will be required to sterilize the water. This quantity of chlorine however cannot be relied upon as a constant in the purification of that water because under such conditions more chlorine might be employed than is necessary. I therefore reduce the chlorine until there is a trace of bacteria shown. This quantity of chlorine indicates a certain shade of blue and I match this shade with three or more blue plates and place them in trough $g$. This indicates the maximum dose. However although three tenths may be extreme safety yet two tenths being found to be still within the scope of safety the plates are reduced in number until the color indicated by two tenths is matched. This is the minimum dose and these plates are placed in trough $i$.

In order to augment the testing operation I provide a turbidimeter whereby the water direct from the intakes may be compared with purified water. The untreated water is caused to flow in a continuous stream through a glass conductor of particular construction and presenting a turbidity gauge and the clouding of the glass by atmospheric condensation is also prevented. The conductor consists of a glass pipe 50 enclosed within a second pipe 51 to form an air chamber 52 surrounding the pipe 50. These pipes are closed at their ends by caps or heads 53 and 54 clamped in place by bolts 55, the ends of the pipes being slotted by gaskets 56 in seats 57 in the inside of the heads; while the head is formed with ducts 58 and 59 with which inlet and outlet pipes 60 and 61 respectively are connected, the inner ends of these ducts communicating with the inner pipe, the inlet duct 58 leading to the lower side of the pipe and the outlet duct 59 from the upper side thereof. This inner pipe has attached to the rear side thereof a graduated scale 65 bearing marks of increasing thickness from the left to the right ends of the pipe. These graduations represent degrees of turbidity and are numbered from zero to three hundred. The water direct from the intake is conducted to this turbidimeter by pipe 60 and it flows continually through the same and out to waste through pipe 61. Purified water is caused to flow through the inner pipe of a second conductor consisting of inner and outer pipes 70 and 71 respectively and having intake and discharge ducts 74 and 75. These intake and outlet pipes 74 and 75 lead from and to any available source of purified water. These conductors are mounted in the front wall 100 of the vertical upper portion of a cabinet having a horizontally forward extension 101 in the surface of which the troughs $g$, $h$ and $i$ are set. Within the upper extension of the cabinet is set a tank 105 for containing the color producing agent and a small bore pipe 106 connects this tank to the branch pipe $e$ near its point of junction with the header 3. This pipe 106 is controlled by a valve 107. By this means and the particular location of the tank 105 the color producing agent is caused to drop by gravity and the amount thus fed to the water passing through the branch $e$ may be regulated. To insure that the color agent will be thoroughly mixed with the water this branch is made of tortuous form. Water is conducted from the water mains by a pair of pipes 200 provided with chlorine injectors 201 with which are connected pipes 202 leading from any suitable chlorine container not shown provided with valves 203 operated by valve stems 204 and handles 205 having pointers 206 registering with dials 207 set in the top of the horizontal extension 101 of the cabinet. Purified water flows to and from the receptacle 71 by pipes 207 and 208 respectively and the water from the intake flows to and from the turbidimeter through pipes 60 and 61 respectively; while the chlorinated water flows to and from the troughs by pipes $b$ and 221 respectively. Pressure gages 230 and 231 respectively are connected to the chlorine pipes between the valves 203 and chlorinator 201 by pipes 241 and 240.

The light of the electric lamps 110 is preferably made to shine through the glass tubes.

When the turbidity of the water rises it usually indicates that there is a higher degree of polution, and then if the trough $h$ indicating the blue is fading the dose of chlorine is increased. But if, as rarely occurs, the blue in trough $h$ is maintained then the dose of chlorine is also maintained.

Another reliable test may be made according to the broad conception of my invention. Sometimes it is necessary to test water being treated with another chemical purifier by ascertaining the depth of the color of the water. This test may also be made according to my invention, by comparing the water with a plate or other device showing depth of color of certain value, or the plates may be exchanged or their number varied to produce a color of equal value to or matching the color of the water. It is the practice in the art to give certain density numbers to color values or shades, for instance a medium shade is known as No. 50 and the definite variations to the lightest and darkest may be numbered up to No. 0 and down to No. 100. The apparatus I use for the ocular test is illustrated in Figure 12. It consists of a water conductor 150 with a white lining preferably enamel This conductor is set on a table and fixed in position. Water from the intake flows into this conductor through pipe 151 and after passing through it flows out through pipe 152. The table has a glazed aperture 153 adjacent to the trough and beneath this aperture is an endless belt 154 carrying a series of groups 155 preferably of color producing devices colored glass plates. The groups of these plates may involve progressively increasing numbers from one, representing the palest color or color of lowest density to the deepest or darkest color; or if desired instead of groups of varying numbers of plates a single plate may be substituted for each group, such single plate having a thickness equivalent to the color required in the group. These plates are mounted in frames 156 forming the links of the endless chain and the colors and values of the colors are made visible by an electric lamp 157 with reflector 158 supported beneath the upper length of the chain and in the vertical plane of the glazed aperture 153. The chain may be caused to revolve by a crank 160 or other suitable means, the movement of the chain being very slight and for purposes only of adjusting different plates of the series to position beneath the glazed aperture. Assuming that the color sought to be cleared from the water is yellow, then although the water may not be turbid and yet may be suitable for drinking purposes nevertheless its color may be objectionable and it may be necessary therefore to remove the color matter. This may be done by dosing the water with alum. The amount of alum necessary would depend upon the amount of color matter there is in the water and this is indicated by the depth of the color. It is known what quantity of chemical to put into the water to remove a given depth of color but it has been necessary in the past to dose the water more or less haphazard and this feature of my invention provides a definite color value to be compared with the water and thus determine at a glance how much chemical should be employed to clear the water. By my apparatus as the water flows through trough 151 the belt may be caused to travel until the plate or plates corresponding in color with the color of the water is or are shown through the glazed aperture 153, the contiguity of the trough of water to the color rays emanating from the disc or discs and through the glazed aperture facilitates the matching of the known color values with the water and enables the amount of chemical required to be readily ascertained.

What I claim is as follows:

1. In the continuous treatment of water for purification, a method of testing for the chemical purifier content of the water consisting in causing a specimen of the water being tested to constantly flow in a plurality of streams one within the color reflecting range of a color producing device, and simultaneously in a stream distinct from and adjacent to but out of the color reflecting range of the first mentioned stream for the purpose of ocular comparison of the second stream with the first.

2. In the continuous chlorination of the drinking water supply of a community a method of testing consisting in causing a specimen of the treated water to constantly flow in a plurality of streams one within the color reflecting range of a color producing device and simultaneously in a stream distinct from and adjacent to but out of the color reflecting range of the first mentioned stream for the purpose of ocular comparison of the second stream with the first, then adding a color developing agent to the second stream and finally varying the chlorine content of the water until the colors of the first and second streams match.

3. In the continuous treatment of the water supply of a community for purification causing a specimen of the water being tested to constantly flow in a plurality of streams one within the color reflecting range of a color producing device and simultaneously in a stream distinct from and adjacent to but out of the color reflecting range of the first mentioned stream for the purpose of ocular comparison of the second stream with the first, then adding a color developing agent to the second stream thereby determining the chemical purifier content of the second stream for the purpose of ascertaining the quantity of chemical purifier required to purify the water tested.

4. In the continuous testing of a chlorinated water supply of a community for residual chlorine, causing a specimen of the water being tested to constantly flow in a plurality of streams one within the color reflecting range, of a color producing device and simultaneously in a stream distinct from and adjacent to but out of the color reflecting range of the first mentioned stream for the purpose of ocular comparison of the second stream with the first, then adding a color developing agent to the second stream and finally varying the chemical purifier content until the colors of the first and second streams match, then determining the amount of chemical purifier added to the second stream for the purpose of ascertaining the quantity of chemical purifier required to purify the water tested.

5. An apparatus for the treatment of the water supply of a community consisting of a conductor for conducting water from the main body of the water, a chlorinator coupled to and discharging into the conductor, a chlorine supply pipe leading to the chlorinator, a valve controlling the chlorine supply pipe, a plurality of observation vessels one of said vessels having a colour-reflecting device therein, and another of said vessels presenting a colourless surface, a pipe connected at one end to the said conductor at a point affected by the chlorinator and having branches at its opposite end communicating with said vessels at one end thereof, a discharge pipe connected to the opposite ends of the vessels, a container for a colour-producing agent, a pipe connecting the container to the branch pipe leading into the colourless vessel, and a valve for controlling the last-mentioned pipe.

6. An apparatus for the treatment of the water supply of a community consisting of a conductor for conducting water from the main body of water, a chlorinator coupled to and discharging into the conductor, a chlorine supply pipe leading to the chlorinator, a valve controlling the chlorine supply pipe, a plurality of observation troughs two of which have colour-producing plates in the bottom thereof, the colour plates in one trough indicating a minimum and the colour plates in the other trough indicating a maximum, and a third of said troughs being colourless, a pipe connected at one end to the said conductor at a point affected by the chlorinator and having branches at its opposite end communicating with said troughs at one end thereof, a discharge pipe connected to the opposite ends of the troughs, a container for a colour producing agent, a pipe connecting the container to the branch pipe leading into the colourless trough and controlling the last-mentioned pipe, said branch pipe which communicates with the colourless trough having a sharp bend therein between the point of connection of said last-mentioned pipe and the trough for the purpose of facilitating the mixing of the colour-producing agent with the water.

7. An apparatus for the continuous treatment of the water supply of a community consisting of a conductor for the water from the intake, a chlorinator coupled to the conductor, a chlorine pipe leading to the chlorinator, a valve controlling the chlorine pipe, a cabinet having the handle of the chlorine pipe set in a surface thereof, a pressure gauge set in a surface of the cabinet and connected to the chlorine pipe between the valve and the chlorinator, a plurality of troughs set in a surface of the cabinet, one of the troughs having a colour reflecting device therein, and another of the said troughs presenting a surface clear of colour and a pipe connected to the water conductor at a point affected by the chlorinator and having branches communicating with one end of the troughs, a discharge pipe connected to the opposite ends of the troughs, a container for a colour producing agent, a pipe connecting the container to the branch pipe leading into the clear trough, a valve for controlling the last-mentioned pipe, a turbidimeter set in a surface of the cabinet and having a scale for indicating the degree of turbidity, a pipe for conducting water from the intake to the turbidimeter, and a flow pipe leading from the turbidimeter.

8. In an apparatus for the continuous treatment of the water supply of a community for purification, the combination with a water conductor of a chlorine container, a pipe for conducting chlorine to the water conductor, a valve controlling the chlorine pipe, a pressure gage connected to the chlorine pipe between the valve and the water conductor, a receptacle for a color developing agent, a plurality of water conducting troughs, a valve controlled pipe connecting one of the said troughs to the color developing agent receptacle, a branch pipe connecting the plurality of troughs to the water conductor.

In testimony whereof I have signed my name to this specification.

JOHN H. HARRINGTON.